(12) United States Patent
Kim et al.

(10) Patent No.: US 9,494,615 B2
(45) Date of Patent: Nov. 15, 2016

(54) METHOD OF MAKING AND ASSEMBLING CAPSULATED NANOSTRUCTURES

(75) Inventors: Sang-Gook Kim, Wayland, MA (US);
Soohyung Kim, Cambridge, MA (US);
Hyung Woo Lee, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 210 days.

(21) Appl. No.: 12/611,222

(22) Filed: Nov. 3, 2009

(65) Prior Publication Data

US 2010/0132080 A1 May 27, 2010

Related U.S. Application Data

(60) Provisional application No. 61/117,388, filed on Nov. 24, 2008.

(51) Int. Cl.
| | |
|---|---|
| *G01Q 70/12* | (2010.01) |
| *B82Y 15/00* | (2011.01) |
| *B82Y 35/00* | (2011.01) |
| *B82Y 30/00* | (2011.01) |

(52) U.S. Cl.
CPC .............. *G01Q 70/12* (2013.01); *B82Y 15/00* (2013.01); *B82Y 35/00* (2013.01); *B82Y 30/00* (2013.01); *Y10T 428/2918* (2015.01); *Y10T 428/2933* (2015.01)

(58) Field of Classification Search
None
See application file for complete search history.

(56) References Cited

U.S. PATENT DOCUMENTS

| | | | |
|---|---|---|---|
| 5,264,722 A | 11/1993 | Tonucci et al. | |
| 5,292,689 A | 3/1994 | Cronin et al. | |
| 5,380,546 A | 1/1995 | Krishnan et al. | |
| 5,899,734 A | 5/1999 | Lee | |
| 6,146,227 A | 11/2000 | Mancevski | |
| 6,452,171 B1 | 9/2002 | Moloni | |
| 6,457,350 B1 | 10/2002 | Mitchell | |
| 6,464,853 B1 | 10/2002 | Iwasaki et al. | |
| 6,504,292 B1 | 1/2003 | Choi et al. | |
| 6,545,396 B1 | 4/2003 | Ohki et al. | |
| 6,566,704 B2 | 5/2003 | Choi et al. | |
| 6,628,053 B1 | 9/2003 | Den et al. | |

(Continued)

FOREIGN PATENT DOCUMENTS

| | | |
|---|---|---|
| EP | 1 022 763 A1 | 7/2000 |
| WO | WO 0211216 A1 | 2/2002 |

(Continued)

OTHER PUBLICATIONS

Kim ("Transplanting Assembly of Carbon Nanotubes;" CIRP Annals; vol. 55; No. 1 Jan. 1, 2006; pp. 15-18).*

(Continued)

*Primary Examiner* — Andrew Smyth
(74) *Attorney, Agent, or Firm* — Daly, Crowley, Mofford & Durkee, LLP (57) ABSTRACT

An encapsulated nanostructure fabricated using layers of polymer material and further processed for use in a microscale target device is presented. The fabrication includes the formation on a substrate of an array of encapsulated nanostructures. The encapsulated nanostructures each include a nanostructure and a micro-scale, multi-block structure that encapsulates the nanostructure. Each encapsulated nanostructure can be made usable by a target device by removing, e.g., by etching, one of the layers to expose a portion of the nanostructure.

21 Claims, 10 Drawing Sheets

(56) References Cited

U.S. PATENT DOCUMENTS

| | | | |
|---|---|---|---|
| 6,716,409 B2 | 4/2004 | Hafner et al. | |
| 6,719,602 B2 | 4/2004 | Nakayama et al. | |
| 6,737,939 B2 | 5/2004 | Hoppe et al. | |
| 6,740,910 B2 | 5/2004 | Roesner et al. | |
| 6,831,017 B1 | 12/2004 | Li et al. | |
| 6,838,297 B2 | 1/2005 | Iwasaki et al. | |
| 6,864,481 B2 | 3/2005 | Kaito et al. | |
| 6,866,801 B1 | 3/2005 | Mau et al. | |
| 6,871,528 B2 | 3/2005 | Schlaf et al. | |
| 6,882,051 B2 | 4/2005 | Majumdar et al. | |
| 7,032,437 B2 | 4/2006 | Lee et al. | |
| 7,038,299 B2* | 5/2006 | Furukawa | B82Y 10/00 257/613 |
| 7,048,903 B2 | 5/2006 | Colbert et al. | |
| 7,077,939 B1* | 7/2006 | Crooks | B01D 67/0062 137/1 |
| 7,081,383 B2* | 7/2006 | Gutsche | H01L 28/91 257/E21.019 |
| 7,091,120 B2* | 8/2006 | Buretea et al. | 438/602 |
| 7,118,941 B2* | 10/2006 | Zhang | H01L 23/373 257/706 |
| 7,151,256 B2 | 12/2006 | Guillorn et al. | |
| 7,170,055 B1 | 1/2007 | Deng et al. | |
| 7,181,958 B2 | 2/2007 | Schlaf | |
| 7,211,795 B2 | 5/2007 | Collier et | |
| 7,258,901 B1 | 8/2007 | Lee et al. | |
| 7,491,631 B2* | 2/2009 | Furukawa | H01L 29/4908 257/E21.043 |
| 7,507,987 B2 | 3/2009 | Kim et al. | |
| 7,514,214 B2* | 4/2009 | Wade | B82Y 10/00 250/309 |
| 7,897,030 B2* | 3/2011 | Suh | B82Y 30/00 205/688 |
| 7,947,548 B2* | 5/2011 | Altebaeumer | B82Y 10/00 257/E21.051 |
| 2002/0163079 A1 | 11/2002 | Awano | |
| 2002/0172820 A1* | 11/2002 | Majumdar | B82Y 10/00 428/357 |
| 2003/0020060 A1 | 1/2003 | Iwasaki et al. | |
| 2003/0052585 A1 | 3/2003 | Guillorn et al. | |
| 2003/0096104 A1 | 5/2003 | Tobita et al. | |
| 2003/0178617 A1 | 9/2003 | Appenzeller et al. | |
| 2003/0179559 A1 | 9/2003 | Engelhardt et al. | |
| 2003/0211724 A1 | 11/2003 | Haase | |
| 2004/0055892 A1* | 3/2004 | Oh | B82Y 10/00 205/109 |
| 2004/0071951 A1 | 4/2004 | Jin | |
| 2004/0137730 A1* | 7/2004 | Kim | B82Y 10/00 438/689 |
| 2005/0208304 A1* | 9/2005 | Collier | B01J 23/745 428/403 |
| 2007/0066080 A1* | 3/2007 | Kugler | C08K 3/36 438/725 |
| 2007/0092431 A1* | 4/2007 | Resasco | B01J 23/882 423/447.3 |
| 2007/0108068 A1* | 5/2007 | Suh | B82Y 30/00 205/766 |
| 2007/0170071 A1* | 7/2007 | Suh | B82Y 30/00 205/687 |
| 2008/0014573 A1* | 1/2008 | Nagamura | C12M 35/02 435/4 |
| 2008/0029851 A1* | 2/2008 | Kirby | B82Y 10/00 257/621 |
| 2008/0032238 A1* | 2/2008 | Lu | B01J 35/0013 430/322 |
| 2008/0194073 A1* | 8/2008 | Park | H01L 21/0271 438/424 |
| 2009/0242912 A1* | 10/2009 | Altebaeumer | B82Y 10/00 257/89 |
| 2010/0085684 A1* | 4/2010 | Suh | B82Y 30/00 361/503 |
| 2010/0300893 A1* | 12/2010 | Suh | B82Y 30/00 205/704 |
| 2010/0301299 A1* | 12/2010 | Suh | B82Y 30/00 257/1 |
| 2010/0301734 A1* | 12/2010 | Suh | B82Y 30/00 313/310 |
| 2010/0304215 A1* | 12/2010 | Suh | B82Y 30/00 429/209 |

FOREIGN PATENT DOCUMENTS

| | | |
|---|---|---|
| WO | WO 02/059392 A1 | 8/2002 |
| WO | WO 02/100931 A1 | 12/2002 |
| WO | WO 2004/033370 A1 | 4/2004 |

OTHER PUBLICATIONS

Transmittal of International Preliminary Report on Patentability of the ISA for PCT/US2009/063676 dated Jun. 3, 2011.
Cheung, et al.; "Carbon Nanotube Atomic Force Microscopy Tips: Direct Growth by Chemical Vapor Deposition and Application to High-Resolution Imaging;" PNAS; vol. 97; No. 8; Apr. 11, 2000; pp. 3809-3813.
El-Aguizy, et al.; "Transplanting Carbon Nanotubes;" American Institute of Physics; Applied Physics Letter; vol. 85; No. 24; Dec. 13, 2004; pp. 5995-5997.
Kim; "Transplanting Assembly of Carbon Nanotubes;" CIRP Annals; vol. 55; No. 1; Jan. 1, 2006; pp. 15-18.
Kim, et al.; "Deterministic Transplanting Assembly of Individual Carbon Nanotubes to Mems Cantilevers for Bioscanning;" Twelfth International Conference on Miniaturized Systems for Chemistry and Life Science; Oct. 16, 2008; pp. 880-882.
PCT Search Report of the ISA for PCT/US 2009/063676 dated Dec. 27, 2010.
Written Opinion of the ISA for PCT/US2009/063676 dated Dec. 27, 2010.
Choi et al., "Fully sealed high-brightness carbon-nanotube field-emission display", Applied Physics Letters, vol. 75 No. 7 (Nov. 15, 1999) 3129-3131, 3 pages.
Gröning et al., "Properties and characterization of chemical vapor deposition, diamond field emitters", Solid State Electronics, 45 (2001), 929-944, 16 pages.
Li et al., "Bottom-up approach for carbon nanotube interconnects", Applied Physics Letters, vol. 82 No. 15 (Apr. 14, 2003), 2491-2493, 3 pages.
Lee et al., "Fabrication of flexible field emitter arrays of carbon nanotubes using self-assembly monolayers", Applied Physics Letters, vol. 82 No. 21 (May 26, 2003), 3770-3772, 3 pages.
International Search Report for PCT/US03/32109 dated Mar. 1, 2004, 5 pages.
Database Online "Method for Manufacture of Switching Devices by Selective Growth of Carbon Nanotubes", XP-002270461, Abstract dated Jan. 14, 1999, 2 pages.

* cited by examiner

METHOD OF MAKING AND ASSEMBLING CAPSULATED NANOSTRUCTURES

CROSS-REFERENCE TO RELATED APPLICATIONS

This application claims priority from U.S. Provisional Patent Application No. 61/117,388, filed Nov. 24, 2008, incorporated herein by reference in its entirety for all purposes.

STATEMENT REGARDING FEDERALLY SPONSORED RESEARCH

Not applicable.

FIELD OF THE INVENTION

This invention relates generally to fabrication and handling of nanostructures.

BACKGROUND OF THE INVENTION

In recent years, there has been much interest in nanostructures, such as carbon nanotubes and related structures, e.g., nanofibers and nanowires, and their potential use in a wide range of applications. Some nanostructure-based products have already appeared in the market place, for example, scanning probe microscopy probes with carbon nanotube probe tips. However, wide-spread commercial use has been hampered by difficulties in integrating individual nanostructures into target micro-scale devices. One challenging aspect of such integration involves nanostructure handling. More specifically, individual nanostructures cannot yet be easily transferred to a target site. Controlling nanostructures in terms of number, shape, size and location has also proven challenging. Of course, to successfully commercialize any nanostructure product use, it is critical that the nanostructure that has been integrated in a target device retain its original properties. Preserving the nanostructure's original properties during product manufacture with existing technologies remains an issue. These problems must be addressed in order to achieve the high yield, fast rate and low cost needed for mass production of nanostructure-based devices.

Prior efforts have tended to focus on two alternative approaches: i) attaching the individual nanostructure directly to the target site; or ii) synthesizing the nanostructure on the target site. These approaches require additional tasks that not only are labor-intensive and time-consuming but subject the nanostructures to further manipulation as well. Typically, when nanostructures are grown on target sites, there is a need to remove redundant nanostructures and/or trim nanostructures to achieve a desired nanostructure length. Nanostructures that are fabricated elsewhere are usually welded (or bonded) to the target site. Consequently, product manufacturing based on existing approaches such as these is inadequate for large-scale production purposes.

SUMMARY OF THE INVENTION

In one aspect, a method of fabricating nanostructures includes forming an array of encapsulated nanostructures on a substrate. The encapsulated nanostructures include nanostructures and multi-block structures to encapsulate the nanostructures.

Embodiments may include one or more of the following features. The array of encapsulated nanostructures can be formed by: disposing catalytic material at sites on the substrate; growing the nanostructures on the sites of the catalytic material; providing layers of polymers, including at least a bottom layer and a top layer, over the nanostructures; and processing the layers of polymers to form the multi-block structures. The bottom layer and the top layer can have etching selectivity to each other. The nanostructures can be carbon nanotubes or other types of nanostructures.

In another aspect, a method of fabricating a scanning probe microscopy probe includes fabricating an encapsulated nanostructure that includes a nanostructure and a multi-block structure to encapsulate the nanostructure, attaching the encapsulated nanostructure to a probe tip end of a cantilever, and removing a portion of the multi-block structure to expose a portion of the nanostructure. The exposed portion of the nanostructure provides a probe tip at the probe tip end of the cantilever.

In yet another aspect, a device includes a nanostructure and a multi-block structure that encapsulates the nanostructure. The nanostructure is a nanostructure that was grown on a substrate and the multi-block structure is a multi-block structure that was formed by providing layers of polymers over the nanostructure and processing the layers to produce the multi-block structure.

This nanostructure encapsulation scheme, which can be achieved with simple polymer coating and pattern processes, provides a robust mechanism for nanostructure control and handling. It controls nanostructure orientation and desired length (for a given application) in a deterministic and repeatable way. In addition, the encapsulation of the nanostructure with a multi-block structure makes nanostructure handling much easier. Individual nanostructures need not be manipulated during transfer to a target site. In addition to providing a protective carrier for the nanostructure, the multi-block structure also allows precise attachment of the nanostructure to the target site. Moreover, a portion of the multi-block structure remains at the target site to support and hold the nanostructure firmly during use. Each encapsulated nanostructure can be made usable by a target device by removing, e.g., by etching, one of the layers to expose a portion of the nanostructure. Because the nanostructure is not directly attached to the target site, as it is with some conventional techniques, there is greater control over the orientation of the nanostructure when it is integrated or installed in a target device. Thus, overall, the polymer layering and patterning techniques, which produce a micro-scale "packaging" for the nanostructure, ensure greater control over the manipulation of nanostructures while providing geometrical uniformity. This approach to nanostructure and nanostructure-based device production offers an effective solution to the problems of mass-producing nanostructure-based devices.

BRIEF DESCRIPTION OF THE DRAWINGS

The foregoing features of the structures, methods and concepts described above and elsewhere herein may be more fully understood from the following description of the drawings in which.

DETAILED DESCRIPTION

Figure 1:
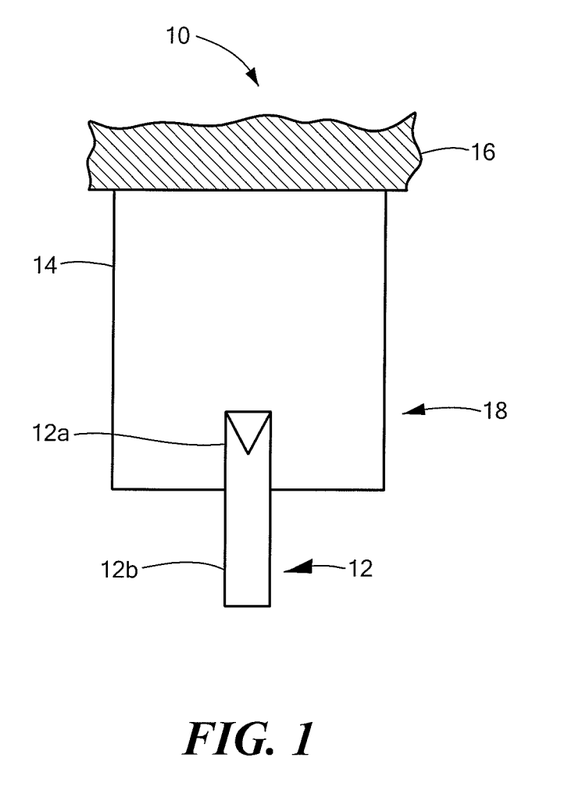
FIG. 1 shows a cross-sectional side view of an exemplary device that includes a nanostructure embedded in a micro-scale block.

Referring to FIG. 1, shown in a cross-sectional view, a micrometer-scale ("micro-scale") device 10 includes a nanostructure 12, a micro-scale support element or block 14 in which a portion 12a of the nanostructure 12 is embedded, and a base structure 16 that defines a target site. The nanostructure can be, for example, a nanotube, nanowire, nanofiber or other nanometer-scale ("nano-scale") structure. The nanostructure can be made of carbon. A nanotube made of carbon (carbon nanotube or "CNT"), can be a single-walled carbon nanotube (SWCNT) or a multi-walled carbon nanotube (MWCNT). The nanostructure can be a non-carbon nanostructure as well, for example, a silicon nanowire. Together the nanostructure 12 and block 14 form a device 18. The device 18, more specifically, the block 14 portion of device 18, is attached to or mounted on the base structure 16. In one exemplary embodiment, the micro-scale device 10 may be a scanning probe assembly for a scanning probe microscope. The assembly would include a base structure like a cantilever with a probe tip at one end to scan specimen surfaces. In such an embodiment, the exposed portion of the nanostructure, portion 12b, would serve as the probe tip. The orientation of the device 18 relative to the target site (as defined by base structure 16) can vary with the application. Thus, the device 18 need not be mounted to a base structure that is positioned above the device 18 as shown. Instead, it could be mounted to a base structure that is positioned beneath or to one side of the device 18.

Presented herein are exemplary techniques for producing the device 18. Some processing occurs prior to transfer of a nanostructure to a particular target site. This "pre-transfer processing" produces individually encapsulated nanostructures. In one embodiment, as will be described, the pre-processing simultaneously produces an array of individually encapsulated nanostructures for use at numerous target sites. Further processing, or "post-transfer processing," may occur at a target site to produce a device like device 18, that is, one in which embedded portion of the nanostructure is firmly held in a micro-scale block while the other portion of the nanostructure is exposed for use by an application (i.e., the type of target device in which it is utilized). The exposed portion, shown in the illustrative device 18 of FIG. 1 as portion 12b, may serve a microscope probe tip (as discussed above) or perform some other function. The type of function will vary with the application. The techniques used to produce the encapsulated nanostructure and device 18 are designed to provide control over structure (e.g., nanostructure length and orientation), ease of handling and other optimizations, as will be described more fully below.

Figure 2:
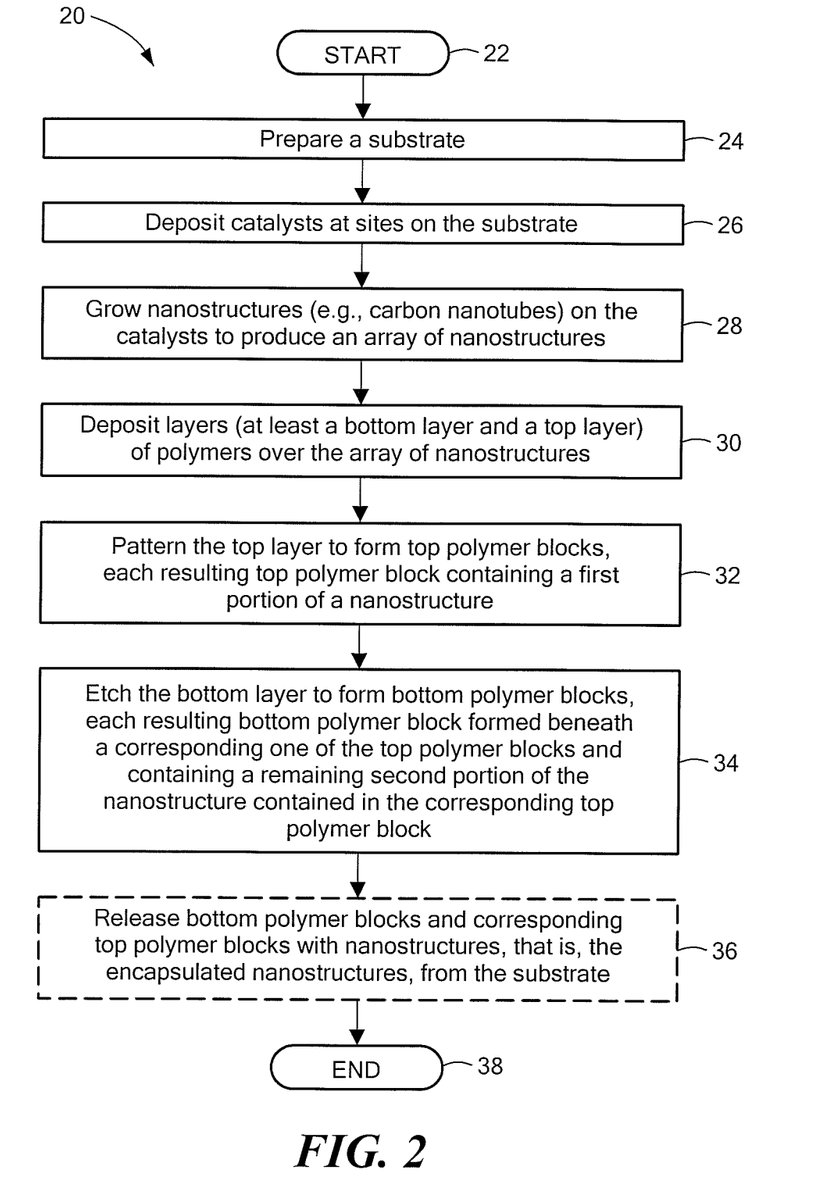
FIG. 2 shows an exemplary process for producing encapsulated nanostructures.

Referring to FIG. 2, an exemplary "pre-transfer" process 20 for producing encapsulated nanostructures is shown. When the process begins (at step 22), a substrate is prepared (step 24) and catalytic material is deposited at sites on the prepared substrate (step 26). The placement of the catalytic material (or, simply, "catalysts") defines the number, location and diameter of the nanostructures. The nanostructures are grown, i.e., synthesized, on the catalysts (step 28). After the synthesis is completed, at least two layers of polymers, including at least a bottom polymer layer and a top polymer layer, are deposited over the nanostructures (step 30). The top polymer layer is patterned (step 32) to form top polymer blocks or portions, each containing a portion of a different nanostructure. The bottom layer is then etched (step 34) to form bottom polymer blocks or portions, each formed beneath a corresponding one of the top polymer blocks and containing a remaining portion the nanostructure contained in the corresponding top polymer block. The resulting structures of top/bottom block pairs containing nanostructures are the encapsulated nanostructures.

Still referring to FIG. 2, at this point in the process the fabrication processing of the encapsulated nanostructures is complete and the individual encapsulated nanostructures are ready for release from the substrate. The release may be performed as a discrete step (shown as optional step 36) where transfer to a target site after release is desirable. Alternatively, as will be described later with reference to FIG. 4, the release of an individual encapsulated nanostructure may be performed when it is transferred to a given target site. The end of the "pre-transfer" process thus occurs (at step 38) after an array of encapsulated nanostructures has been realized. Because each nanostructure is individually encapsulated in this manner, the nanostructures are protected during handling, for example, when they are transferred to a target site. Encapsulation makes nanostructure handling/transfer easier as well. The process 20 can be scaled to produce any desired number of encapsulated nanostructures, e.g., an array, for batch production of many encapsulated nanostructures at the same time. Alternatively, it can be used to produce a single encapsulated nanostructure at a time for a serial approach to encapsulated nanostructure production. Also, the substrate can be partitioned so that smaller batches of one or more encapsulated nanostructures can be made available to users.

Further details of the encapsulated nanostructure production process 20 (from FIG. 2) are described below in conjunction with FIGS. 3A-3F. Although the nanostructure in the example embodiment of FIGS. 3A-3F are nanotubes, they could be some other form of nanostructure (such as nanowires, nanofibers, etc.) instead.

Figure 3A:
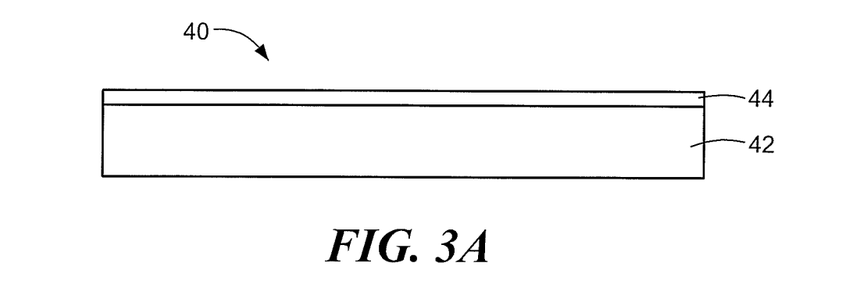
FIGS. 3A-3F show cross-sectional side views of structures produced during various stages of the production process from FIG. 2.

Referring first to FIG. 3A, a first structure 40 corresponding to process step 24 includes a substrate 42 (such as a silicon, $SiO_2$ or glass substrate) and a thin, e.g., 40 nm, layer of titanium 44 that has been deposited on the substrate 42. The titanium layer 44 prepares the substrate 42 for catalytic material deposition and nanotube growth. More specifically, the titanium layer 44 works as both an adhesion promoter of catalytic material and a preventer of silicide formation due to a high temperature during nanotube growth.

Figure 3B:
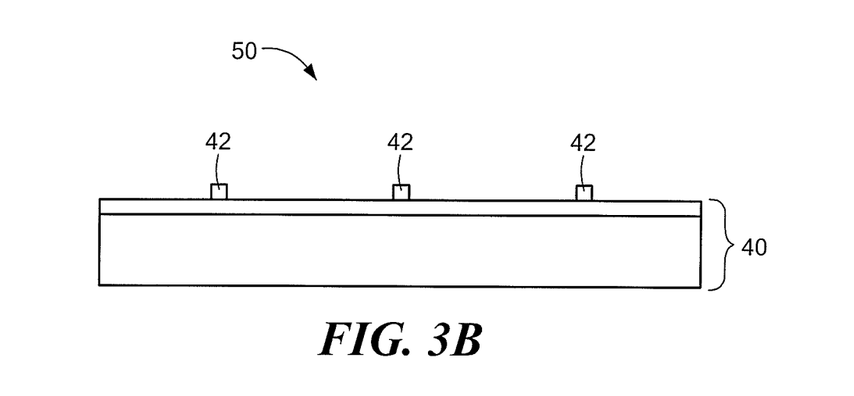

Referring to FIG. 3B, a second structure 50 corresponding to step 26 includes catalysts 42 deposited on the prepared substrate 40. The catalysts 42 may be metal catalysts (e.g., elements such as nickel, cobalt or iron) or other material capable of catalyzing growth of the desired type of nanostructure. For example, for nanowire growth, a metal oxide such as zinc oxide (ZnO) or tin dioxide (SnO2) could be used. In one embodiment, using metal catalysts, an array of catalytic particles (or "dots") with various diameters (for example, in the range of approximately 50 to 200 nm) and thicknesses (for example, in the range of approximately 1 to 30 nm) is provided to sites on the prepared substrate 40 by electron beam ("e-beam") lithography followed by catalytic metal deposition and lift-off operations. The use of catalysts helps the growth of carbon nanotubes in particular as it prevents the ends of the carbon nanotubes from being "capped" during synthesis and allows about 70-90% of the carbon target to be converted to single-walled nanotubes. To achieve precision in catalyst diameter definitions during e-beam lithography, a substrate with a relatively flat top surface should be used.

Figure 3C:
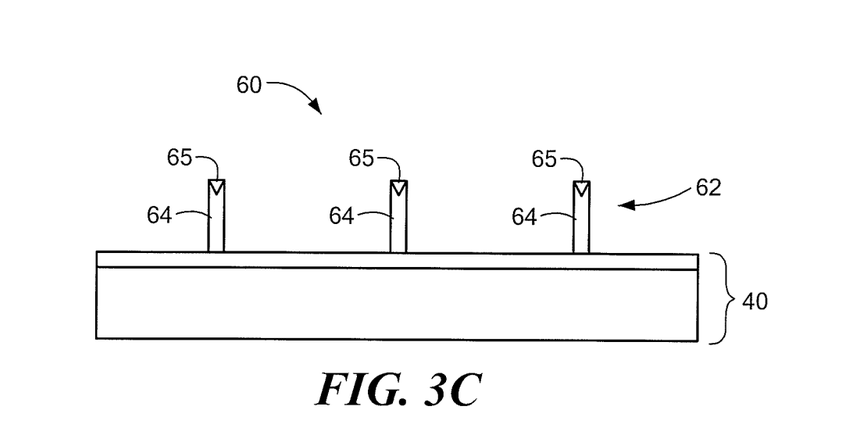

Referring to FIG. 3C, a third structure 60 corresponding to step 28 includes an array 62 of nanotubes 64 grown on the catalytic dots 42 (shown in FIG. 3B). In one embodiment, this growth may be achieved by using a plasma-enhanced chemical vapor deposition (CVD). Other CVD methods such as microwave plasma-assisted CVD or laser pulsed CVD, to give but a few examples, could also be used. The grown nanotubes 64 may be in the range of about 5 to 10 µm long. Other suitable catalyst deposition materials/techniques and nanostructure synthesis techniques may be used to produce an array of vertically aligned nanostructures on the substrate. The catalyst deposition and growth conditions are determinative of the number and spacing of the nanostructures grown on the substrate. It will be understood that catalyst particles may or may not be present at ends of grown nanostructures (for example, ends 65 of nanotubes 64, in FIG. 3C), depending on the nanostructure and growth process.

Figure 3D:
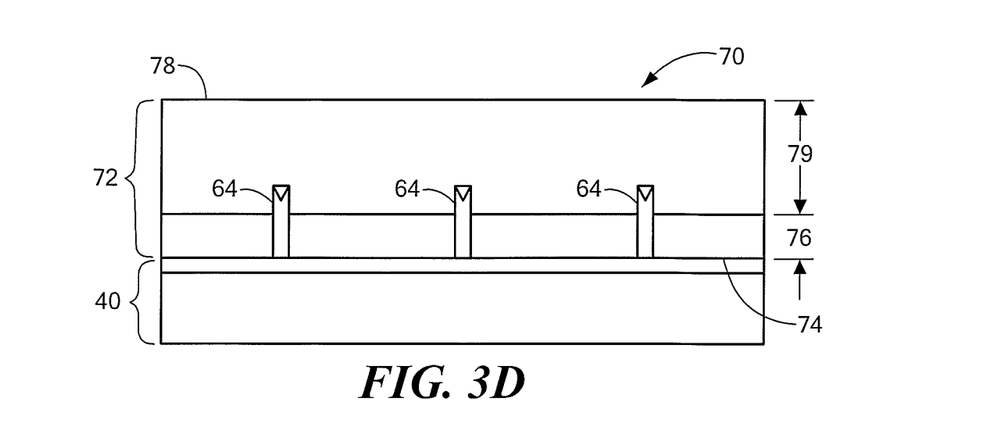

Referring to FIG. 3D, a fourth structure 70 corresponding to step 30 includes layers of polymers 72 deposited over the nanotubes 64. In the illustrated implementation, the layers 72 include two layers. A bottom layer 74 is applied first with a spin-coating process. The thickness of the bottom layer 74, indicated by reference numeral 76, determines the length of the exposed portion of the nanotubes when the nanotubes are ready for use in the target device (as depicted in FIG. 1). Then, a top polymer layer 78 having a thickness 79 is applied, again with a spin-coating process. It should be appreciated that techniques other than spin casting, for example, printing, spray coating and vacuum deposition, may also be used to provide the polymer layers. Both the top and the bottom polymer layers, top layer 78 and bottom layer 74, respectively, have etching selectivity to each other. The etch rate of the bottom layer 74 is much faster (for example, at least a 100 times faster) than that of the top layer 78. With chemically selective etching, an etchant can be used to etch through the bottom layer 74 without etching the top layer 78. Any reactions on the top layer 78 with the etchant will be negligible. A feasible choice of materials for the polymeric layers 74, 78 can include, for example, polymethylglutarimide for the bottom layer 74 and SU-8 for the top layer 78.

Figure 3E:
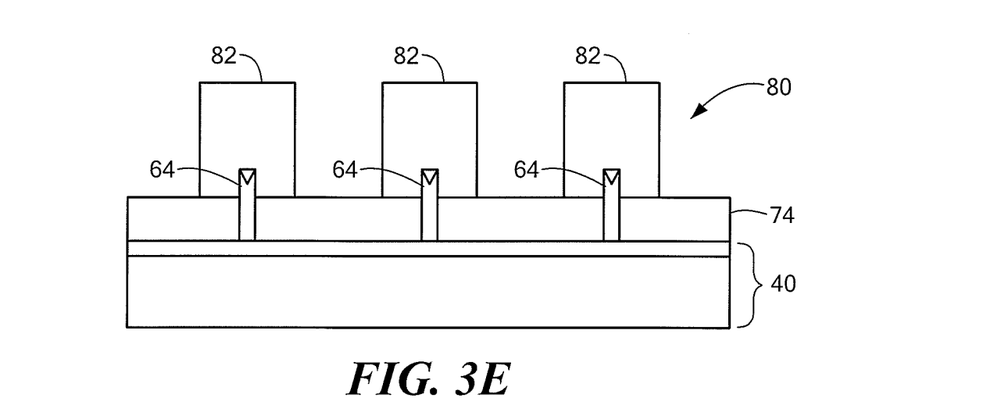
Figure 3F:
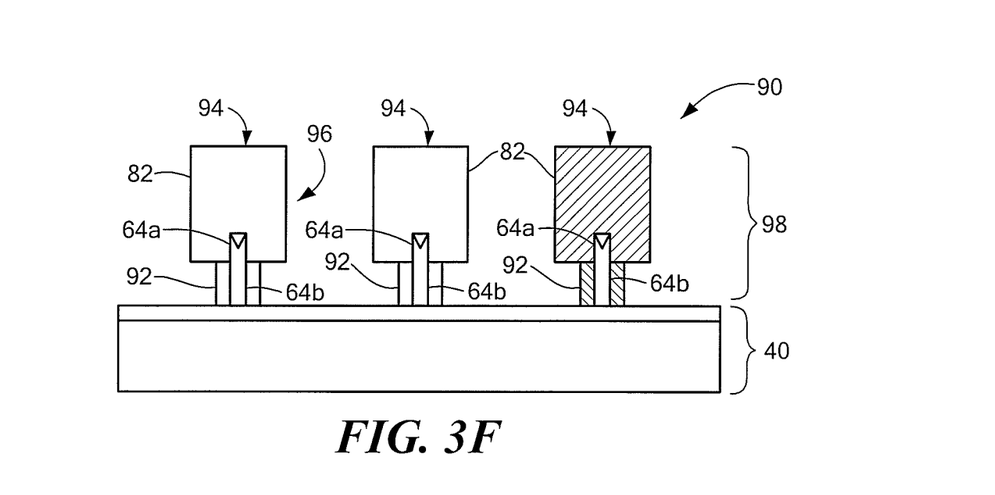

The patterning of the polymer materials is illustrated in FIGS. 3E-3F. Referring to FIG. 3E, a fifth structure 80 corresponding to step 32 includes top polymer blocks 82 resulting from patterning the top layer (top layer 78, from FIG. 3D). Referring to FIG. 3F, a sixth (and final) structure 90 corresponding to step 34 includes bottom polymer blocks 92 formed beneath corresponding top polymer blocks 82 by etching the bottom layer (that is, bottom layer 74 shown in FIG. 3D). The top polymer blocks 82 work as an etching mask while the bottom layer is being etched. At this stage of the processing, each top polymer block 82 contains a first portion 64a of a single nanotube 64 and each corresponding bottom polymer block 92 contains the other portion, i.e., a second portion 64b, of that same nanotube 64.

Still referring to FIG. 3F, each block pair having a top block 82 and a bottom block 92 forms a "multi-block structure", indicated by reference number 94. The multi-block structure 94 was produced as described earlier with reference to FIG. 2 (in particular, steps 32, 34, 36) and FIGS. 3D-3F. Each multi-block structure 94 and nanostructure 64 contained in that multi-block structure 94 is an encapsulated nanostructure 96. If an array of nanostructures is grown, then an array 98 of encapsulated nanostructures 96 will be produced, as shown. The rightmost multi-block structure 94 depicted in the figure is shown shaded to distinguish it from the entire encapsulated nanostructure 96 for purposes of illustration.

Figure 4A:
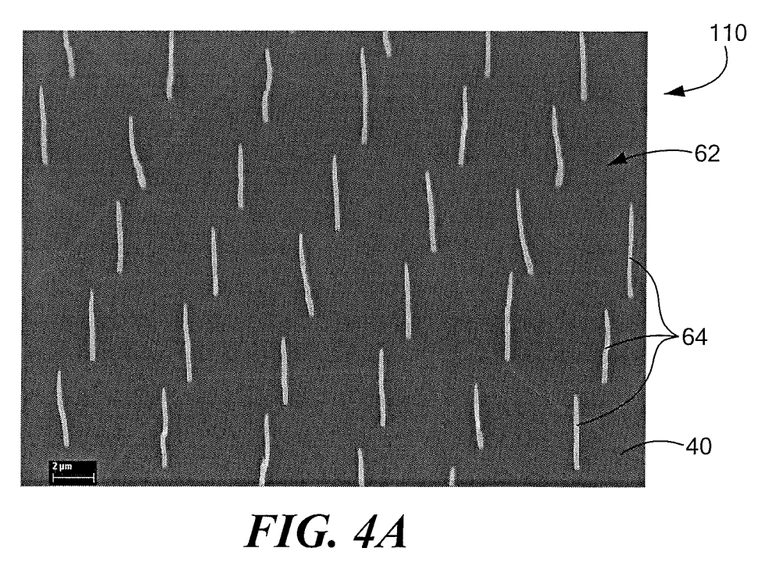
FIGS. 4A-4B show scanning electron microscope images of nanostructures prior to and after encapsulation.
Figure 4B:
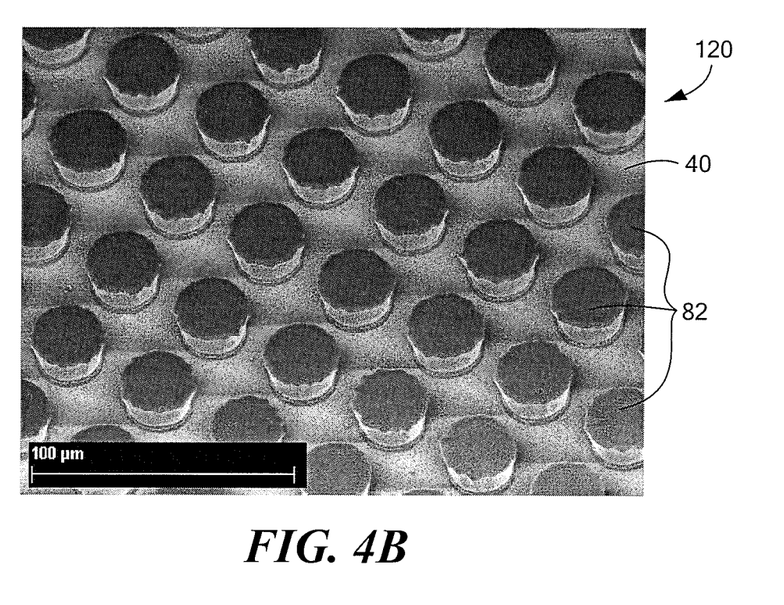

FIGS. 4A-4B show scanning electron microscopy images of structures produced by the nanostructure processing. FIG. 4A shows, in a tilted view, an example structure 110 having the array 62 of nanostructures 64 grown on the substrate 40 (depicted as structure 60 in FIG. 3C). FIG. 4B shows a topographic view of an example structure 120 with the array 98 of multi-block structures on substrate 40 (depicted as structure 90 in FIG. 3F). The only portion of the multi-layer structure 94 (from FIG. 3F) visible in this image is the top block 82.

Figure 5:
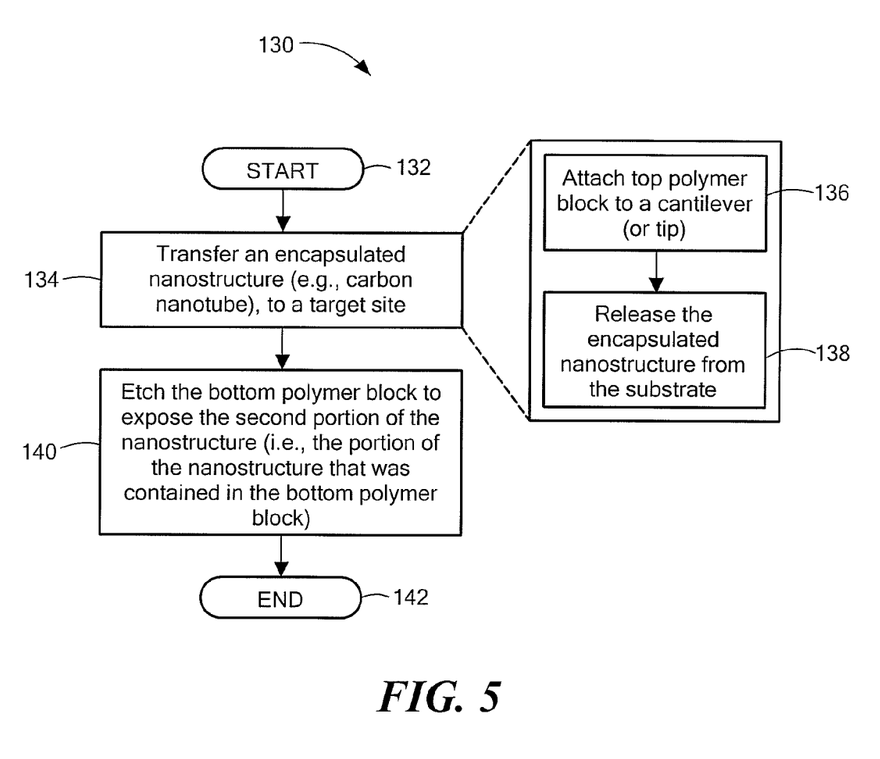
FIG. 5 shows an exemplary process for integrating an encapsulated nanostructure into a target device.

Referring now to FIG. 5, an exemplary process 130 for integrating a nanostructure encapsulated according to techniques described above with reference to FIG. 2 and FIGS. 3A-3F into a target micro-scale device at a target site is shown. The process 130, once initiated (at step 132), proceeds with the transfer of top and bottom polymer block pairs (or multi-block structures), each encapsulating a single nanostructure, to a target site (step 134). In one embodiment, for a scanning probe microscopy (e.g., atomic force microscopy) probe application, the transfer step at 134 can involve the attachment of the top polymer block to a cantilever or cantilever tip (step 136) and release of the encapsulated nanostructure from the substrate (step 138). The bottom polymer block is then etched to expose at least some, preferably all (or substantially all), of the second portion of the nanostructure (step 140). The process terminates at step 142. The resulting target device includes a nanostructure embedded in a micro-scale block (i.e., the top polymer block 82, shown in FIGS. 3E-3F).

Further details of the process 130 (from FIG. 5) for an example probe assembly embodiment are described below in conjunction with FIGS. 6A-6E.

Figure 6A:
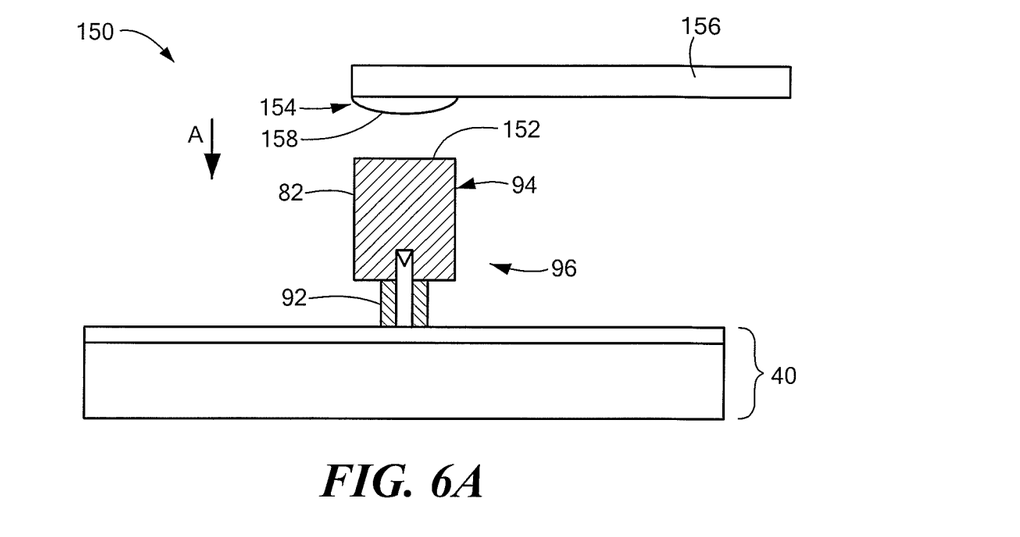
FIGS. 6A-6E show cross-sectional side views of an scanning probe microscopy probe assembly at various stages during the target site process from FIG. 5.

Turning first to FIG. 6A, a first assembly 150 shows a probe tip end 154 of a cantilever 156 being brought into contact with a top surface 152 of a selected one of the top blocks 82. The probe tip end 154 contains a small amount of adhesive 158. The top block 82 and corresponding one of the bottom blocks 92 collectively form the multi-block structure or block pair 94 (again shown as shaded). A select one of the nanostructures 64 and multi-block structure 94 together form the encapsulated nanostructure 96. The tip end 154 (with adhesive 158) is moved towards the encapsulated nanostructure 96 through vertical movement (movement along the z-axis or direction, as indicated by arrow A) of the cantilever 156 until the tip end 154 with adhesive 158 is in contact with the encapsulated nanostructure 96. The cantilever 156 may be supported (and its movement controlled) by, for example, a micro-motion stage under an optical microscope, i.e., a "z-stage", a z-scanner or other suitable mechanism. If a manual assembly with motion stage is used, the cantilever may be held in place (at one end of the motion stage) with sample mounting tape. It will be understood that other techniques could be used as well. For example, the encapsulated nanostructure 96 could be controlled to move towards the tip end 154 with the cantilever 156 held in a fixed position.

Figure 6B:
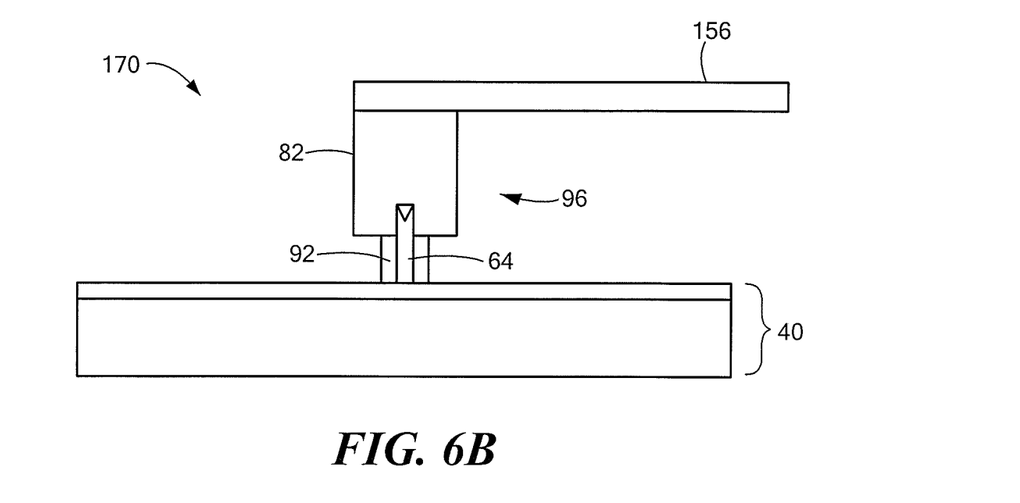

Referring to FIG. 6B, a second assembly 170 shows the encapsulated nanostructure 96 in contact with the cantilever 156. The adhesive 154 (not visible in this view) is cured for some amount of time, for example, a few minutes, so that a firm bond can be formed between the encapsulated nanostructure 96 and the cantilever 156.

Figure 6C:
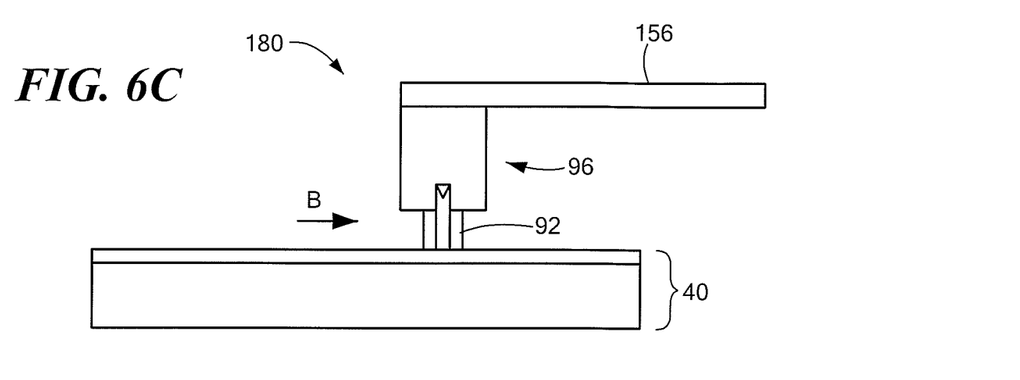

Referring now to FIG. 6C, a third assembly 180 corresponding to process step 138 shows the encapsulated nanostructure 96 being sheared from the substrate 40. In one exemplary implementation, the encapsulated nanostructure 96 is sheared with a micro-motion stage. The encapsulated nanostructure 96 may be held on or otherwise coupled to the micro-motion stage. The micro-motion stage can be controlled to move, for example, horizontally in one scan direction (e.g., along the x-axis), as indicated by arrow B, so that the movement results in an application of force to the assembly 180 sufficient to cause the shearing. Other substrate removal mechanisms could also be used, e.g., etching.

Figure 6D:
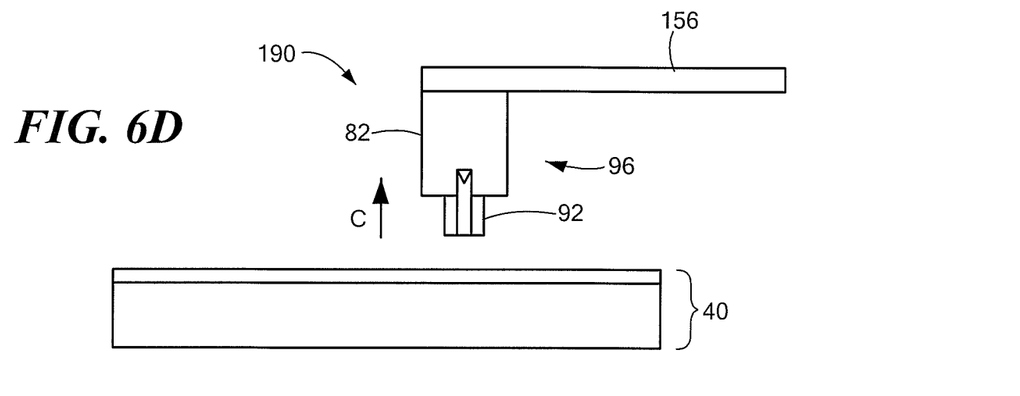

As shown in a fourth assembly 190 of FIG. 6D, the encapsulated nanostructure 96, once sheared from the substrate 40, is released to move vertically (in a z-direction, or normal to the substrate 40) away from the substrate 40. The direction of this vertical movement is indicated by arrow C.

As discussed above, movement is required to position the cantilever's probe tip end 154 relative to the encapsulated nanostructure 96 with attached substrate 40 as well as to separate the encapsulated nanostructure 96 from the substrate 40. Commercially available scanners, motion stages and other motion devices can be used to effect the necessary movement along various axes of motion.

Figure 6E:
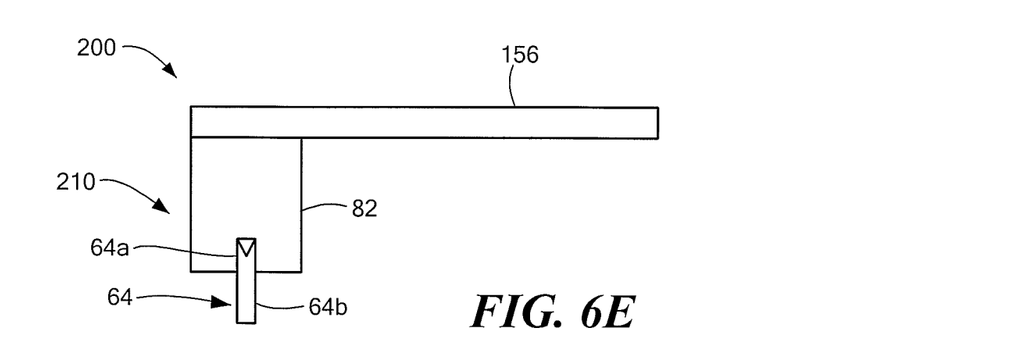

Referring now to FIG. 6E, a final assembly 200 includes a device 210 resulting from the process step 140. The device 210 includes the top block 82 and nanostructure 64. The top block 82 has a portion of the nanostructure 64, shown again as portion 64a, embedded in it. The bottom block 92 (shown in previous views of FIGS. 6A-6D) has been removed. In one embodiment, the bottom block 92 is etched with an etchant until all or substantially all of that block has been removed to expose a portion of the nanostructure, shown again as portion 64b. Device 210 is a probe tip embodiment of device 18 from FIG. 1.

Multiple encapsulated nanostructures can be mounted at the same time for parallel assembly, for example, parallel probe assembly or single SPM, multi-probe assembly. In the case of the probe application, if the cantilever or tip end is wide or there is multiple cantilever tip end, multiple encapsulated nanostructures can be mounted at the same time. More generally, parallel assembly is feasible by implementing assembly schemes already available in industry. One example is the slider bonding process used for head gimbal assembly in hard disk drive manufacturing.

Nanostructure dimensions, including diameter and length, can be changed to suit the needs of the application. For example, and referring back to step 26 in FIG. 2 in conjunction with structure 50 in FIG. 3B, the diameter can be adjusted by changing the diameter of the catalyst dots. The length of the exposed portion of the nanostructure can be controlled by selecting the thickness of the bottom polymer layer during the fabrication process. For example, and referring back to step 30 and FIG. 3D, a predetermined length is set by controlling the thickness 76 of the bottom layer 74 deposited during processing. Increasing the bottom layer's thickness 76 will result in a longer exposed nanostructure portion and decreasing its thickness will shorten the exposed portion of nanostructure. For probe tip applications, the length of the exposed (usable) portion of the nanostructure is a key design parameter. The ability to control the length in this manner minimizes variations in probe tip lengths during probe manufacturing. Overall nanostructure length depends on catalyst and nanostructure growth conditions.

The support provided by the remaining micro-scale block (i.e., the block 92 formed from the top layer 78) to the nanostructure 64 is predetermined through the selection of top layer thicknesses 79, and patterning of the top layer 78, which defines the shape of the top block 92 (by determining how much material remains to surround the nanostructure 64). It will be appreciated that that these selections are a matter of design choice, taking into account the intended function of the nanostructure in its target application.

Typically, the end (or top) of a nanotube is flat, but may be shaped for tilt compensation angles using known techniques. In addition, the end may be coated or otherwise adapted for certain purposes.

Figure 7A:
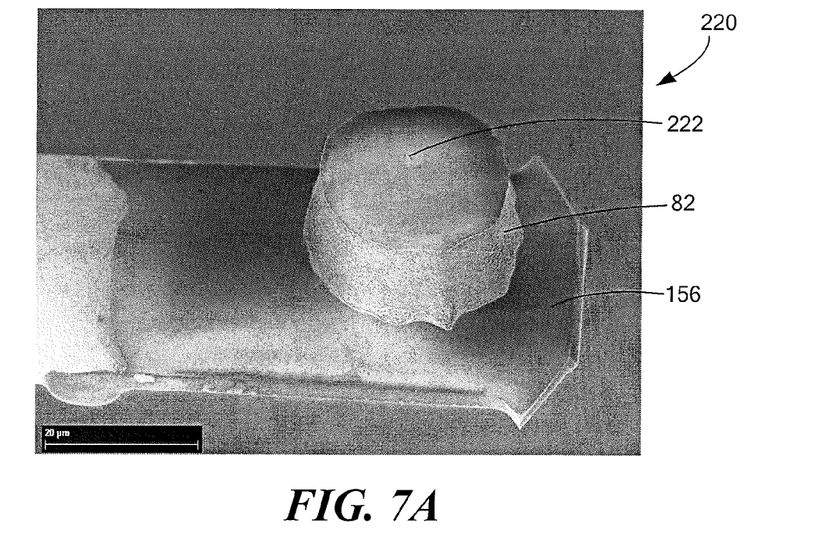
FIGS. 7A-7B show scanning electron microscope images for a tilted view (FIG. 7A) and side view (FIG. 7B) of an atomic force microscopy probe made according to the techniques shown in FIGS. 2 and 5.
Figure 7B:
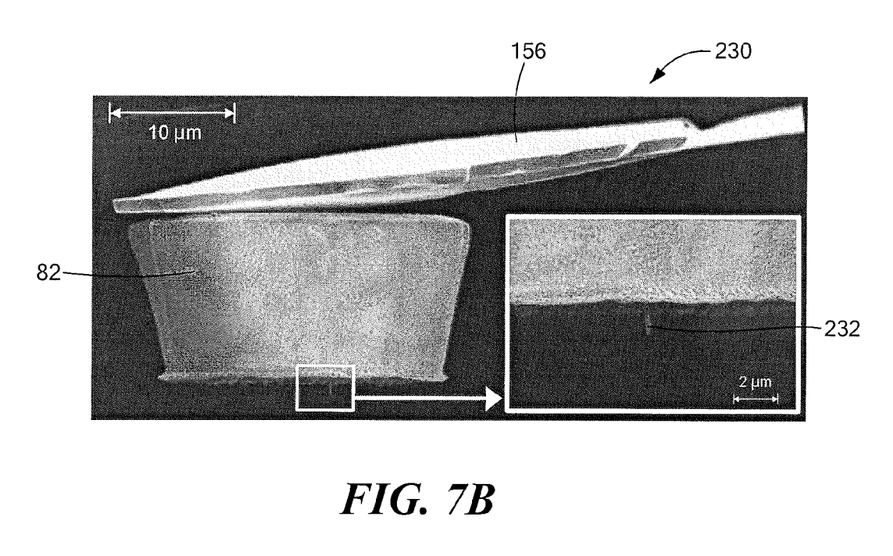

Referring now to FIGS. 7A-7B, scanning electron microscope images of a CNT probe constructed according to techniques described herein are shown. FIG. 7A shows, in a tilted view, an example of a CNT probe shown here as probe 220. The view shows the cantilever 156, the top block 82 and the exposed portion of the nanostructure, portion 64b from FIG. 6E, shown here as CNT probe tip 222. FIG. 7B shows, in a side view, an example of a CNT probe indicated here by reference numeral 230. The inset shows an enlarged view of the probe's CNT probe tip indicated by reference numeral 232.

Figure 8A:
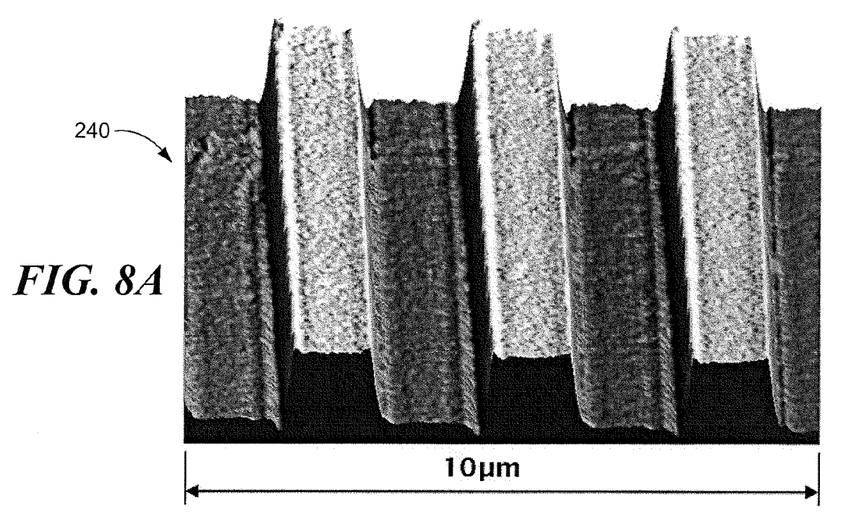
FIGS. 8A-8B show scanning images generated by an atomic force microscope having a probe made according to techniques shown in FIGS. 2 and 5.
Figure 8B:
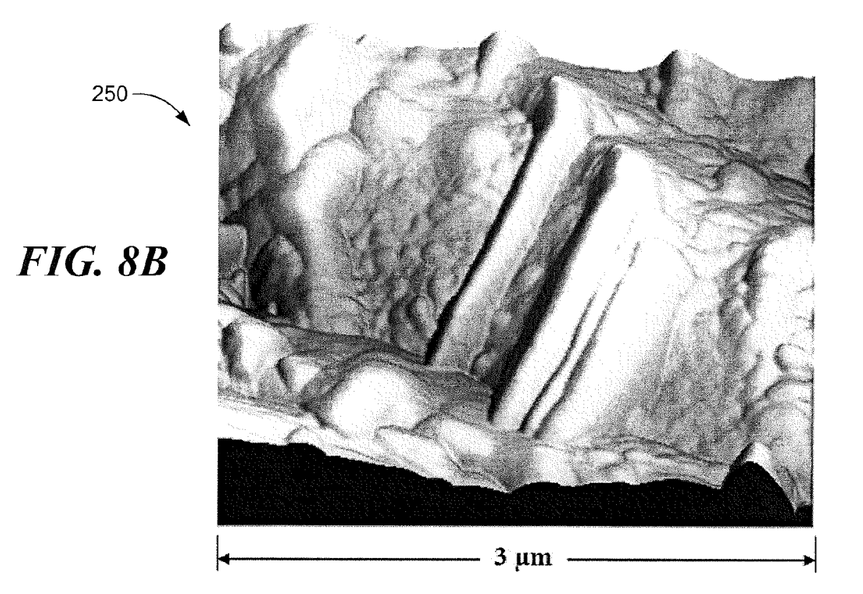

FIG. 8A and FIG. 8B show atomic force microscopy images. FIG. 8A shows a view of a scanned sample 240. FIG. 8B shows a view of a scanned sample 250 at a higher magnification than that shown in FIG. 8A. The images were produced by an atomic force microscope using a nanotube probe made according to the processes described above.

The above-described approach to producing devices that have a nanostructure such as a CNT as a component offers significant advantages over conventional technologies. The fabrication of the nanostructure, including its encapsulation, is performed prior to device assembly. Thus, the nanostructure growth is decoupled from the device assembly. In addition, the encapsulation of individual nanostructures in micro-scale polymer blocks serves to bridge the gap between the nano-scale domain of the nanostructures and the micro-scale domain of the target devices. The scale mismatches between nano- and micro-fabrication processes, which in the past have limited the practical production of nanostructure-based devices, are therefore eliminated. The length of usable "exposed" nanostructure available at the target site, can be set to meet requirements of a target device through the choice of bottom layer thickness as well as the etch rates of the materials selected for the polymer layers. The orientation of the nanostructures, including the vertical alignment on the substrate, as well as the position of the nanostructure at the target site is also helped by the encapsulation. The layers surround the nanostructures on the substrate and the post-patterning multi-block structure supports the nanostructure during transfer and attachment. The top block/top layer securely holds the nanostructure during device use, thus providing increased stability and durability. The encapsulated nanostructure can be more easily and firmly attached to the target site, as the encapsulated nanostructure is easier to manipulate than an unencapsulated one. Therefore, the encapsulation can transform CNTs and other nanostructures into more manageable and manufacturable form with which existing micro-scale manufacturing technologies can be utilized.

The processes described above are compatible and can be integrated with many existing commercial manufacturing processes, making the encapsulated nanostructures easy to incorporate into existing devices and future device designs. For example, the processes can be integrated into standard scanning probe (e.g., silicon probe) manufacturing processes. The encapsulated nanostructures can be made available to probe manufacturers on a small piece of the substrate, allowing such users to easily produce probes with nanostructure probe tips following an assembly process such as that described above with reference to FIGS. 5 and 6A-6E. The substrates may be partitioned to provide a user with a desired number of nano structures.

Although the encapsulated nanostructure concept has been discussed within the context of a scanning probe microscopy application, it will be appreciated that it can be applied to other types of devices and applications. Other applications can include nano electric devices having a nanotube or nanowire bridge, for example, electron beam guns, single-electron transistors, field emission devices, nanolithography systems among many other electronic applications, as well as electro-mechanical, structural material and biological applications.

All references cited herein are hereby incorporated herein by reference in their entirety.

Having described preferred embodiments which serve to illustrate various concepts, structures and techniques which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of producing nanostructures comprising:
    forming on a substrate an array of encapsulated nanostructures, the encapsulated nanostructures in the array including nanostructures and multi-block structures to encapsulate the nanostructures;
    wherein forming comprises:
        disposing catalytic material at sites on the substrate;
        growing the nanostructures on the sites of the catalytic material;
        providing layers of polymers, including at least a bottom layer and a top layer, over the nanostructures; and
        processing the layers of polymers to form the multi-block structures;
    wherein the top layer and the bottom layer are chosen to have etching selectivity to each other; and
    wherein the bottom layer comprises a layer of polymethylglutarimide and the top layer comprises a layer of SU-8.

2. A device comprising:
    a nanostructure; and
    a multi-block structure that encapsulates the nanostructure;
    wherein the nanostructure was grown on a substrate,
    wherein the multi-block structure was formed by providing layers of polymers over the nanostructure grown on the substrate and processing the layers to produce the multi-block structure, and
    wherein the nanostructure is configured to be separated from the substrate and relocated on another substrate by attaching the nanostructure to a cantilever using an adhesive,
    wherein the top layer comprises a layer of SU-8 and the bottom layer comprises a layer of polymethylglutarimide.

3. The device of claim 2 wherein the nanostructure was grown in an array of nanostructures and wherein the polymer layers were provided over the array and processed to produce multi-block structures, one for and encapsulating each nanostructure in the array.

4. The device of claim 2 wherein the nanostructure comprises a selected one of a nanotube, a nanofiber or a nanowire.

5. The device of claim 2 wherein the nanostructure comprises a carbon nanotube.

6. The device of claim 2 wherein the layers of polymers include a bottom layer and a top layer having etching selectivity to each other.

7. A method, comprising:
    forming freely removable multi-block structures comprising deterministically encapsulated nanostructures comprising:
        forming each multi-block structure with at least one nanostructure encapsulated by the multi-block structure; and
        forming each multi-block structure comprising a top portion and a bottom portion, the top portion and the bottom portion have etching selectivity to each other so that the top portion is larger than the bottom portion, a first portion of the corresponding nanostructure is embedded in the top portion of the multi-block structure and a second portion of the corresponding nanostructure is embedded in the bottom portion of the multi-block structure; and
    releasing the multi-block structures individually from a first substrate,
    wherein a surface area of a side of the bottom portion attached to the substrate is smaller than a surface area of a side of the top portion opposite the side of the bottom portion.

8. The method of claim 7, further comprising determining the length of nanostructure using the thickness of the bottom portion.

9. The method of claim 7, wherein forming freely removable multi-block structures comprising deterministically encapsulated nanostructures comprises forming freely removable multi-block structures comprising carbon nanotubes.

10. The method of claim 7, wherein forming freely removable multi-block structures comprises:
    disposing catalytic material at sites on the first substrate;
    growing the nanostructures on the sites of the catalytic material;
    providing layers of polymers comprising at least the bottom portion and the top portion of the multi-block structures over the nanostructures; and
    processing the layers of polymers to form the multi-block structures.

11. The method of claim 7, further comprising moving the multi-block structures individually to a second substrate different from the first substrate after releasing the corresponding multi-block structure from the first substrate.

12. The method of claim 7, further comprising removing material of the bottom portion of the multi-block structures to expose at least some of the second portion of the corresponding nanostructure after releasing the corresponding multi-block structure from the first substrate and prior to moving the corresponding multi-block structure to the second substrate.

13. The method of claim 12, wherein removing the material comprises etching the material.

14. The method of claim 11, wherein moving the multi-block structures individually to a second substrate different from the first substrate after releasing the corresponding multi-block structure from the first substrate comprises placing the corresponding nanostructure in direct contact with the second substrate.

15. The method of claim 11, further comprising attaching the side of the top portion of the multi-block structure to an object to release and move the multi-block structure.

16. The method of claim 10, wherein providing layers of polymers comprising at least the bottom portion and the top portion comprises providing the bottom portion comprising a layer of polymethylglutarimide and providing the top portion comprising a layer of SU-8.

17. A device comprising:
a nanostructure; and
a multi-block structure that encapsulates the nanostructure, the multi-block structure comprising a top portion and a bottom portion, the top portion and the bottom portion having etching selectivity to each other so that the top portion is larger than the bottom portion, a first portion of the nanostructure is embedded in the top portion of the multi-block structure and a second portion of the corresponding nanostructure is embedded in the bottom portion of the multi-block structure,
wherein the nanostructure was grown on a substrate,
wherein the multi-block structure is configured to be freely removable from the substrate and relocated on another substrate by attaching the top portion of the multi-block structure to an object,
wherein a surface area of a side of the bottom portion attached to the substrate is smaller than a surface area of a side of the top portion opposite the side of the bottom portion.

18. The device of claim 17, wherein the length of nanostructure is determined by the thickness of the bottom portion.

19. The device of claim 17, wherein the nanostructure was grown in an array of nanostructures and wherein polymer layers were provided over the array and processed to produce multi-block structures, one for and encapsulating each nanostructure in the array.

20. The device of claim 17, wherein the nanostructure comprises a selected one of a nanotube, a nanofiber or a nanowire.

21. The device of claim 17, wherein the nanostructure comprises a carbon nanotube.

* * * * *

UNITED STATES PATENT AND TRADEMARK OFFICE
CERTIFICATE OF CORRECTION

PATENT NO. : 9,494,615 B2  
APPLICATION NO. : 12/611222  
DATED : November 15, 2016  
INVENTOR(S) : Sang-Gook Kim et al.

Page 1 of 1

It is certified that error appears in the above-identified patent and that said Letters Patent is hereby corrected as shown below:

Column 3, Line 5, delete "views of an" and replace with --views of a--.

Column 9, Line 16, delete "nano structures" and replace with --nanostructures--.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*